(12) United States Patent
Murakami

(10) Patent No.: US 7,359,143 B2
(45) Date of Patent: Apr. 15, 2008

(54) CARTRIDGE DROP DETECTION DEVICE IN MAGNETIC TAPE LIBRARY APPARATUS

(75) Inventor: Jun-ichi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 11/186,774

(22) Filed: Jul. 22, 2005

(65) Prior Publication Data

US 2006/0215302 A1 Sep. 28, 2006

(30) Foreign Application Priority Data

Mar. 25, 2005 (JP) ............................. 2005-088803

(51) Int. Cl.
*G11B 15/68* (2006.01)
*G11B 33/10* (2006.01)
(52) U.S. Cl. ......................................... 360/92; 360/69
(58) Field of Classification Search ................ 360/92, 360/69, 98.04, 98.05, 98.06; 242/337, 337.1; 369/30.06, 30.2, 30.28–31.01; 720/600, 720/615, 632–634, 654
See application file for complete search history.

(56) References Cited

FOREIGN PATENT DOCUMENTS

JP 3-91157 4/1991
JP 5-219827 8/1993

*Primary Examiner*—Craig A. Renner
(74) *Attorney, Agent, or Firm*—Staas & Halsey LLP

(57) ABSTRACT

Disclosed is a cartridge drop detection device including a media rack for accommodating a cartridge containing a magnetic tape medium, a tape drive for holding the magnetic tape medium, and a robot for retrieving the cartridge from the media rack and for transporting the cartridge to the tape drive, wherein the cartridge drop detection device comprises: a microphone, installed on a floor, for detecting that the cartridge has dropped on the floor; a vibration detection sensor for detecting vibration applied to a tape library apparatus; and a detection circuit for determining that the cartridge has dropped on the floor when a voltage detected by the microphone and a voltage detected by the vibration detection sensor have exceeded respective threshold values, whereby providing a device which can reliably detect whether any cartridge in the magnetic tape library apparatus has dropped or not.

3 Claims, 2 Drawing Sheets

GENERATED IMPACT SOUND

CARTRIDGE DROP DETECTION DEVICE IN MAGNETIC TAPE LIBRARY APPARATUS

CROSS-REFERENCE TO RELATED APPLICATIONS

This application is based upon and claims priority from Japanese Patent Application No. 2005-088803, filed on Mar. 25, 2005, the contents being incorporated herein by reference.

BACKGROUND OF THE INVENTION

1. Field of the Invention

The present invention relates to a cartridge drop detection device for use in a magnetic tape library apparatus.

2. Description of the Related Art

Cartridges containing magnetic tape recording media are still in widespread use for such reasons as their low cost-per-bit compared with other types of storage media and their large storage capacity. A tape library apparatus for storing cartridges containing magnetic tape recording media holds, for example, 100 to 700 cartridges, and performs read or write operations on a magnetic tape recording medium by retrieving the selected cartridge from a media rack and loading it into the necessary tape library by means of a tape transport robot.

Such a tape library apparatus is used, for example, to back up important data concerning customers. Therefore, any trouble during transport must be avoided as much as possible because it can lead to a serious problem. However, due to vibrations caused by an earthquake or the like, a cartridge may fall off the media rack and drop onto the floor of the tape library apparatus. If the operator, being unaware of the existence of the dropped cartridge, continues to operate the tape library apparatus, the tape transport robot while moving around on the floor may run over the cartridge and destroy it.

In the prior art, an acceleration sensor has been used to detect vibrations caused by an earthquake or the like. Further, the tape transport robot has been equipped with a servo control unit to which a certain magnitude of vibration force is applied externally when vibrations such as those caused by an earthquake occur. Since this external force causes an electric current larger than usual to flow, the servo control unit detects the occurrence of a problem, and stops the operation of the tape transport robot upon detection of the problem.

[Patent Document 1] Japanese Unexamined Patent Publication No. H05-219827

[Patent Document 2] Japanese Unexamined Patent Publication No. H03-91157

In the above prior art method, as abnormal vibrations are detected by relying only on the acceleration sensor or the servo control unit, the operation of the tape transport robot is stopped even when there is no cartridge on the floor of the tape library. This has led to the problem that there are cases where the operation of the tape transport robot is stopped unnecessarily. More specifically, there is no guarantee that a cartridge will necessarily drop whenever an earthquake or the like occurs causing vibrations of the magnitude that exceeds a vibration (acceleration) threshold below which the apparatus can guarantee that any cartridge designed to the specification of the apparatus will not drop. In the prior art, however, the operation of the tape library apparatus has had to be stopped even when all the media stay on the rack.

SUMMARY OF THE INVENTION

It is an object of the present invention to provide a device that can reliably detect whether any cartridge in a magnetic tape library apparatus has dropped or not.

To achieve the above object, the present invention provides a cartridge drop detection device for use in a magnetic tape library apparatus, comprising: a microphone, installed on a floor, for detecting that the cartridge has dropped on the floor of the tape library apparatus; a vibration detection sensor for detecting vibration applied to the tape library apparatus; and a detection circuit for determining that the cartridge has dropped on the floor when a voltage detected by the microphone and a voltage detected by the vibration detection sensor have exceeded respective threshold values.

As the vibration detection sensor is used in combination with the microphone installed to detect the vibration of the floor, it becomes possible to reliably detect whether any cartridge has dropped on the floor, or not, and the cartridge can thus be protected from being destroyed by the moving robot.

DESCRIPTION OF THE PREFERRED EMBODIMENTS

Figure 1:
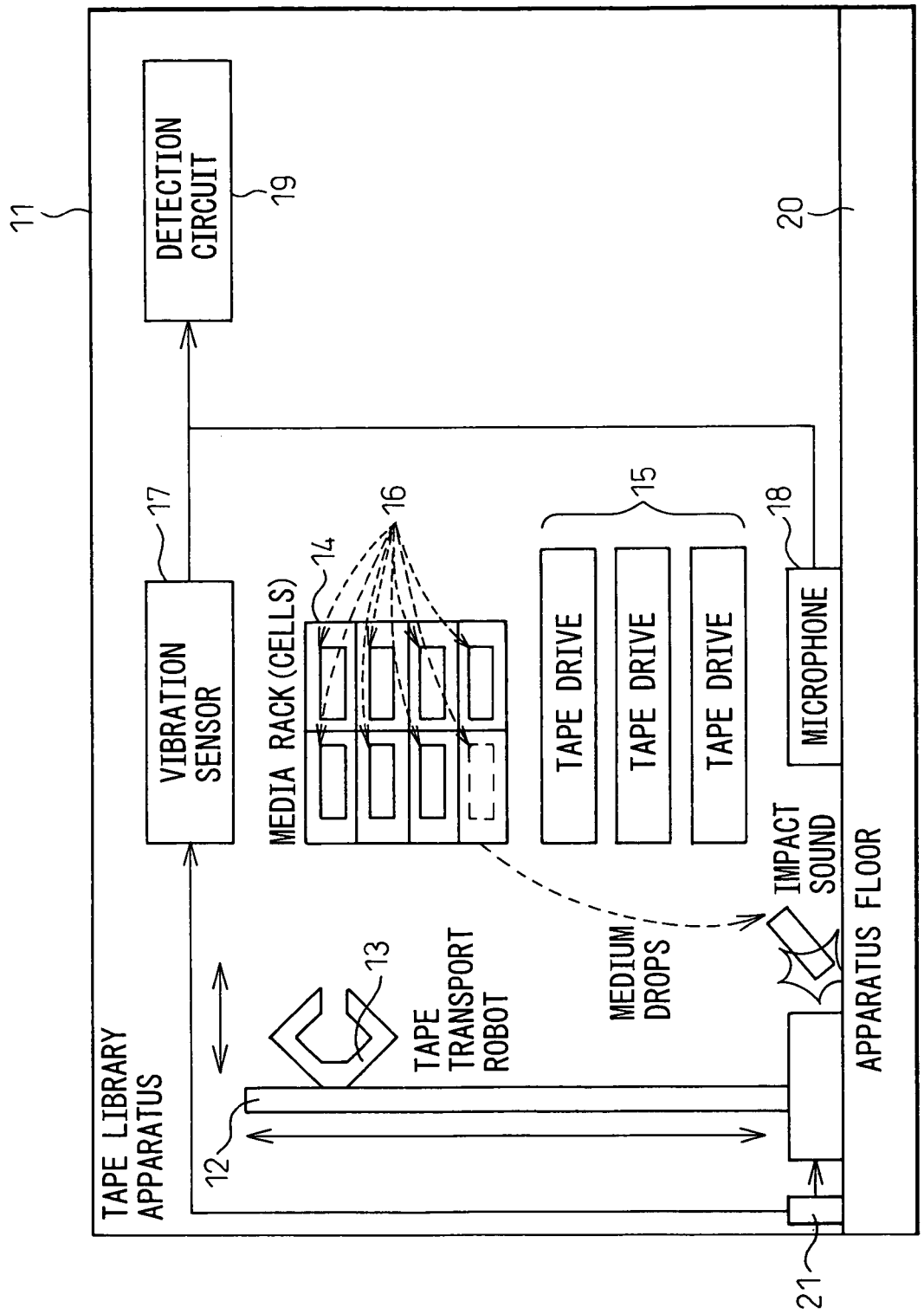
FIG. 1 is a block diagram showing the configuration of a cartridge drop detection device in a tape library apparatus according to an embodiment of the present invention.

FIG. 1 is a block diagram showing the configuration of a cartridge drop detection device in a tape library apparatus according to an embodiment of the present invention. In the figure, reference numeral 11 is the tape library apparatus, 12 is a rail of a tape transport robot, 13 is an arm of the tape transport robot, 14 is a media rack, 15 is a tape drive, 16 is a magnetic tape recording medium, 17 is a vibration sensor, 18 is a microphone, 19 is a detection circuit, and 20 is a floor of the tape library apparatus 11, the floor being made, for example, of an iron plate. The microphone 18 is mounted in contact with the surface of the floor 20. Further, reference numeral 21 is a servo control unit for the tape transport robot.

In operation, the arm 13 of the tape transport robot works to remove the cartridge containing the selected magnetic tape recording medium 16 from the media rack 14, and to load the cartridge into the tape drive 15 where read or write operations are performed on the magnetic tape recording medium 16.

If any cartridge containing the magnetic tape recording medium 16 drops from the media rack 14 onto the floor 20 due to vibrations caused by an earthquake or the like, the microphone 18 detects the sound generated by the dropping impact and, at the same time, a certain magnitude of vibration is applied to the servo control unit 21. Since this vibration causes an electric current larger than usual to flow, the vibration sensor 17 detects the occurrence of the trouble.

Based on the output of the vibration sensor 17 and the output of the microphone 18, the detection circuit 19 determines whether any cartridge has dropped on the floor 20.

Figure 2:
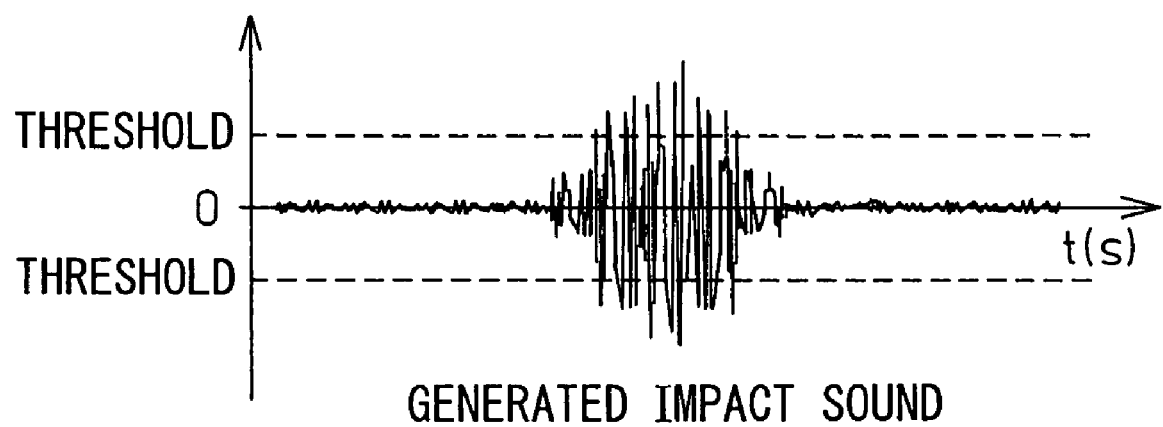
FIG. 2 is a diagram showing an output waveform of a microphone 18.

FIG. 2 is a diagram showing the output waveform of the microphone 18. For example, when a cartridge drops on the floor 20, the resulting impact sound is picked up by the microphone 18 whose output voltage thus exceeds a threshold value. When this output voltage exceeds the threshold value, and when the output voltage of the vibration sensor 17 exceeds a predetermined threshold value, the detection circuit 19 determines that a cartridge has dropped on the floor 20. Based on this determination, the movement of the tape transport robot is stopped to prevent the cartridge from being damaged by the moving robot.

As the device of the present invention can reliably detect whether any cartridge in the magnetic tape library apparatus has dropped or not, there is no need to stop the operation of the tape library apparatus unnecessarily.

What is claimed is:

1. A cartridge drop detecting device for use in a magnetic tape library apparatus comprising:
    a media rack for accommodating at least one cartridge containing a magnetic tape medium;
    a tape drive for holding the magnetic tape medium when reading from or writing to the magnetic tape medium; and
    a robot for retrieving the cartridge from the media rack and for transporting the cartridge to the tape drive, wherein the cartridge drop detection device comprises:
        a microphone, installed on a floor, for detecting that the cartridge has dropped on the floor of the tape library apparatus;
        a vibration detection sensor for detecting vibration applied to the tape library apparatus; and
        a detection circuit for determining that the cartridge has dropped on the floor when a voltage detected by the microphone and a voltage detected by the vibration detection sensor have exceeded respective threshold values.

2. The cartridge drop detection device as claimed in claim 1, wherein:
    the vibration detection sensor is an acceleration sensor.

3. The cartridge drop detection device as claimed in claim 1, wherein:
    the vibration detection sensor is a servo control unit for the robot.

* * * * *